United States Patent [19]
Kemp et al.

[11] Patent Number: 5,908,634
[45] Date of Patent: Jun. 1, 1999

[54] ANIMAL FEED CONTAINING MOLASSES BENTONITE AND ZEOLITE

[76] Inventors: Philip W. Kemp, Caslick Lane, Broadwater Via Stanthorpe; Thomas Hall Nougher, The Falls, Tenterden Via Gyra, both of Australia

[21] Appl. No.: 08/858,175

[22] Filed: Nov. 14, 1996

Related U.S. Application Data

[63] Continuation-in-part of application No. 08/368,723, Jan. 4, 1995, abandoned, which is a continuation of application No. 07/969,846, Jul. 19, 1993, which is a continuation of application No. PCT/AU92/00104, Mar. 10, 1992, abandoned.

[51] Int. Cl.⁶ ..................................................... A23K 1/165
[52] U.S. Cl. ........................... 424/442; 424/489; 424/499; 426/807
[58] Field of Search .................................. 424/442, 489, 424/499; 514/807

[56] References Cited

U.S. PATENT DOCUMENTS

| | | | |
|---|---|---|---|
| 3,983,255 | 9/1976 | Bass | 426/54 |
| 4,135,943 | 1/1979 | Morishita | 106/209 |
| 4,160,041 | 7/1979 | Schroeder | 426/69 |

*Primary Examiner*—D. Gabrielle Brouillette
*Attorney, Agent, or Firm*—Robert L. Shaver; Frank J. Dykas

[57] ABSTRACT

An alkaline animal feed, in granular or solid form, with a pH greater than or equal to 7.5, comprising Dunder, dunder and molasses, or dunder and molasses by-products mixed with sorptive materials, including bentonite and zeolite. Hydrated lime may be added as a source of calcium, to improve pellet quality, for moisture absorbency and for pH control. Cereal grains, trace elements, bypass proteins and other additives may be included in the mix to tailor the animal feed to the user's requirements.

17 Claims, No Drawings

ANIMAL FEED CONTAINING MOLASSES BENTONITE AND ZEOLITE

This application is a continuation-in-part of Ser. No. 08/368,723 filed Jan. 4, 1995 (abandoned), which was a continuation of Ser. No. 07/969,846 filed Jul. 19, 1993 (abandoned) based on International Application No. PCT/AU92/00104 filed Mar. 10, 1992.

BACKGROUND OF THE INVENTION

Technical Field. This invention relates to an animal feed. The animal feed may be fed directly to animals, preferably ruminants, in granular or solid block form, or may be mixed with feed supplements, trace elements, protein meals, cereals, hay and/or the like.

Background: There is ever increasing interest in utilizing the by-products of agricultural processes to produce useful benefits. Such utilization of by-products which would otherwise be waste saves in two ways; it saves the cost of disposal of the by-product as waste, and it saves the cost of the useful product which the by-product can replace. One industry which has the need to find a use for its by-products is the sugar cane industry. The end products of sugar cane processing include ethyl alcohol for use as an industrial chemical, a gasoline substitute in automobiles, rum, sucrose or table sugar, and molasses.

Sucrose is manufactured by crushing sugar cane and placing the juice therefrom in pans which are placed in a vacuum. Under vacuum, water boils away from the sugar cane juice, and when the solution becomes saturated, sucrose crystals form from the solution. The liquid is removed from the crystallized sugar and placed in other vacuum pans and evaporated again. The second evaporation results in sucrose crystals forming from the solution. The liquid is again removed from the sucrose crystals and the liquid is evaporated under the vacuum a third time. The liquid remaining from the final operation is molasses. Thus, molasses is basically sugar cane juice with much of the sugar removed.

Sugar cane juice or molasses can be further processed by diluting it with water and fermenting it. In the fermentation process, the yeast utilizes the residual sugar in molasses as energy for their metabolism and produce ethyl alcohol, also known as ethanol, as a by-product. The fermented mixture of sugar cane juice or diluted molasses is typically distilled to produce a more purified form of alcohol. This can result in the production of rum, which is used for human consumption, or in the production of ethyl alcohol of very high grade for industrial chemical application, and ethanol which is used as fuel, or as an additive to gasoline.

The material left after sugar cane juice or diluted molasses has been fermented and distilled is known as stillage, Dunder, distiller's grain or slops. Since the yeast has utilized sugar in the fermentation process, there is little sugar left in the stillage or Dunder. In U.S. Pat. No. 3,983,255, Bass notes that "the fermentation residue or effluent—known commercially as slop, vinasses or Dunder, . . . Is almost invariably run to waste". Bass notes that after concentrating six to eight times, slop reaches a concentration of 60° to 80° Brix. This indicates that Bass believes the sugar content of slop is about 10%. This shows that the action of yeast has utilized most of the sugar in molasses, and produced ethanol as a by-product. By comparison, after the first extraction of sucrose crystals from sugar cane juice, the remaining liquid contains 65% sugar, the second extraction of sucrose from sugar cane juice contains 60% sugar, and the third extraction (or black strap molasses) of sucrose from sugar cane juice contains 55% sugar.

Besides sugar and ethanol, other by-products of sugar cane processing and molasses manufacture include acetic acid, citric acid, yeast, butanol, glycerol, dextran, aconitic acid, monosodium glutamate, bacteria, protein, oils, vitamins, other alcohols, fusel oil (a mixture of alcohol), glycerol, succonate, acetate, enzymes and organic material. By-products of the distillation process include stillage, Dunder, or slops. U.S. Pat. No. 4,160,041, Schroeder, at column 3, line 29, discloses that other by-products of the molasses and sugar industry include "Steffen's filtrate, a sugar containing by-product obtained from beet molasses. Another sugar industry by-product in (sic) Myces, which is the residue after separation of yeast cells grown in molasses culture medium".

For many years, the benefits of molasses in stock feeding have been well recognized. These include increased palatability, improved aroma, dust suppression, higher feed intake and extra energy. However, with few exceptions, the practical limitations of molasses inclusion in diets have been difficult to surmount. The major exceptions have been the feed lot industry and selected feed mills with spray line equipment for molasses inclusion to a maximum of typically 3% by weight (because of the difficulties of processing at higher inclusion levels).

Recognizing these advantages and disadvantages of handling the product, numerous attempts have been made to present the product in a free-flowing form. These systems have been based on the following techniques:

1. Microwave treatment of dehydrated molasses in a well-presented form—this suffers from hygroscopic absorption and is a costly addition to normal feed rations;
2. Molasses mixed with copra meal—this is not suitable for mono-gastrics due to the high fiber percentage of the mixture; and
3. Molasses blended with diatomite—the silica level is disadvantageous to nutrition.

A solid animal feed supplement, comprising chiefly of molasses, whey, or a lignosulphonate, in solid block form, is disclosed in AU-B-19119/76 (505607) (PACIFIC KENYON CORPORATION). This patent discloses a feed supplement where the carbohydrate content is present at a concentration of from 45–93% by weight, and one potential source of the carbohydrate is molasses. The patent describes a supplement which requires the addition of solidifying ingredients (including a soluble phosphate or phosphoric acid) sufficient to solidify the supplement into solid block form. The method is not suitable for the production of animal feed in granular form.

DISCLOSURE OF INVENTION

It is an object of the present invention to provide an animal feed based on dunder or dunder and molasses or dunder and molasses by-products, which is relatively easy and inexpensive to manufacture.

It is a preferred object to provide a feed which is highly palatable, does not take up atmospheric moisture, can be handled through normal conveying systems and can be gagged without lumps being formed.

It is a further preferred object to provide a feed which is suitable for bulk-bag filling or silo storage without the necessity for a costly prior step in the process of converting solid formed product (by some method of disintegration) into granules or powder form as is suggested by Bass.

It is a further preferred object to provide a method of coating cereal grains and other seeds.

Other preferred objects will become apparent from the following description.

In one aspect, the present invention resides in an alkaline animal feed, which may be in granular or solid form, comprising Dunder alone, dunder and molasses or dunder and molasses by-products, bentonite and zeolite.

Preferably, the bentonite and zeolite act as sorptive materials for the moisture in the Dunder, molasses and molasses by-products, as the materials are mixed and bound together. In the granular form, hydrated lime may be added to the ingredients as a source of calcium, to improve pellet quality, for moisture absorbency and for pH control.

Magnesium oxide, trace elements, sulfur, calcium, potassium, alkaline sources of phosphorus and bypass proteins, cereal grains (e.g., wheat, barley, oats, rye, sorghum) and other additives may be added to the basic ingredients to enable the feed to be tailored to the end-user's requirements.

The alkaline sources of phosphorus may be selected from: dicalcium phosphate, diammonium phosphate and/or calcium phosphate (as bone meal or phosphate rock).

The molasses may be molasses obtained from a sugar mill (or be a by-product of molasses fermentation). The molasses can be any sugar-containing molasses such as cane or blackstrap molasses, beet molasses, converted molasses, wood sugar molasses, hydrosyrup, citrus molasses or the like.

Dunder is normally a waste product (with little or no value) of the process of separating ethyl alcohol from the residue of molasses fermentation. It typically has a solids content of less than 40%. It may be obtained from the mills at little, if any, cost.

In a preferred embodiment, the properties of the ingredients, expressed in percent by weight, may be:

(a) Dunder, dunder and molasses, dunder and molasses by-products: 10–60%;
(b) Bentonite: 10–80%;
(c) Zeolite: 10–80%.

Preferably, the mixture has a total sugars content of less than 12%, more preferably 10%.

If hydrated lime is added, it may be added in the range of up to 15%, while magnesium oxide may be added in the range of up to 25% for the treatment of grass tetany.

When Dunder is used as the molasses source, it is a natural source of minerals, particularly potassium; also sulfur, calcium, and micro-minerals are available in useful quantities for organic fertilizers. Nitrogen from the present molasses protein and from the dead yeast cells also has value for this purpose. (The feed may be mixed in soils as a nutrient therefor.)

Preferably, the bentonite, zeolite, hydrated lime, trace elements, and other additives are mixed dry in the mixture before the Dunder, molasses and molasses by-products is added and the moisture therein absorbed by the bentonite and zeolite. The mixture is pumped out and may be allowed to cure. If hydrated lime is added to the mix, the curing time may be in the range of 6–8 hours. Preferably, the curing time for the mix is 0–12 hours, dependent, inter alia, on the temperature, humidity, percentage of molasses, percentage of lime, and other factors. If the mixture is fed from the mixer in granular form, the granules are preferably spread out on a surface to dry.

In an alternative embodiment, bentonite, zeolite, cereal grain(s) and/or bypass proteins may be mixed together dry and then extruded, and the extruded pelletized material is then mixed with molasses and hydrated lime in a mixer.

The bypass protein, i.e., solvent extracted and extruded protein meals nay be selected from, inter alia, meat meal, cottonseed meal, copra meal, linseed meal, fish meal, lupine meal, safflower meal, sunflower meal and/or the like.

Various trace nutrients, antibiotics, amino acids and vitamins can also be incorporated in the feed composition, including vitamins A, C and E, tocopherols, as well as antioxidants for these materials such as ethoxyquin (1, 2-dlhydro-6-ethoxy-2, 2, 4-trimethyl quinoline). Other additives that can also be included in the composition are promazine hydrochloride, chloromadionone acetate, oxytetracycline, etc. Rumensin can also be added; this is a drug used to control appetite and increase feed efficiency in ruminants. Bloat inhibitors such as polaxaline can also be employed. The quantity and concentration of these materials which can be employed is preferably in accordance with established custom and usage.

In a second aspect, the present invention resides in an alkaline animal feed, which may be in granular or solid form, wherein molasses by-products are used in, or mixed with, a base material with sorptive properties and dehydrated.

The sorptive materials used in the dehydration process may include a heat treated or extruded material. These materials are preferably heated to a temperature in the range of 90° C. to 180° C. and may or may not be extruded under pressure. This process effectively alters the chemical structure of the materials for a beneficial effect on animal nutrition and may increase the sorptive properties of the materials.

The materials used in this process may include singular or mixtures of wheat, barley, rye, oats, sorghum, corn, triticale, rice, lupines, peas, beans, canola (rape), peanuts, cottonseed, sunflower, safflower, linseed, vetch and other grains and by-product meals such as copra meal, palm kernel meal, meat meal, feather meal, fish meal, cottonseed meal, linseed meal, sunflower meal, canola meal, safflower meal and sunflower meal. The mixtures may contain other by-product materials such as pollard, bran, millrun, cottonseed hulls, gin trash or sunflower hulls.

To these materials or mixtures (pre-heating) may also be added either singularly or mixtures of:

| | |
|---|---|
| Bentonite | up to 50% |
| Zeolite | up to 50% |
| Molasses (or Dunder) | up to 50% |
| Dolomite | up to 50% |
| Gypsum | up to 50% |
| Urea and other non-protein nitrogen (NPN) sources (e.g. sulfate of ammonia) | up to 30% |
| Diatomite | up to 30% |

The resultant material (post heat treatment) may then be used directly in animal feed or may be used as a sorptive material, either by itself or in conjunction with other sorptive materials (e.g., bentonite, zeolite and CaO/MgO) to which Dunder, dunder and molasses or dunder and molasses by-products are then added.

Other products may also be used as sorptive materials, including gypsum, dolomite and diatomite.

In a third aspect, the present invention resides in a method(s) of manufacture for an animal feed as hereinbefore described.

In fourth and fifth aspects, the present invention relates to a fertilizer having the constituents of the product of the first and second aspects; while in a sixth aspect, the present invention resides in a method of manufacture of a fertilizer in accordance with the methods described.

In a seventh aspect, the present invention provides cereal grains or oil seeds coated by the method(s) hereinbefore described.

DETAILED DESCRIPTION OF THE PREFERRED EMBODIMENTS

To enable the invention to be fully understood, a number of examples will now be described.

A. Molasses/bentonite/zeolite mixes
FORMULA (percentage by weight)

| INGREDIENT | EX 1 | EX 2 | EX 3 | EX 4 |
|---|---|---|---|---|
| Molasses-Dunder | 45 | 30 | 60 | 15 |
| Bentonite | 25 | 20 | 10 | 30 |
| Zeolite | 20 | 30 | 10 | 30 |
| Hydrated Lime | 5 | 20 | 10 | 0 |
| Magnesium Oxide | 0 | 0 | 5 | 0 |
| Trace Elements | 1 | 0 | 0 | 0 |
| Bypass Proteins | 4 | 0 | 5 | 25 |

All of the ingredients, with the exception of the Dunder, dunder and molasses, or dunder and molasses by-products, are placed in a mixture in a dry state and are mixed until evenly distributed. The dunder, dunder and molasses, or dunder and molasses by-products are then added to the mixture so that the moisture is absorbed by the bentonite, zeolite and/or hydrated lime.

When the mixture is completely mixed, it is discharged from the mixer in either granular or flowable solid form and is allowed to cure for 4–12 hours before it is bagged or conveyed for storage. The granular form is preferably spread over a surface and the granules allowed to dry.

In an alternative embodiment, bentonite, zeolite, cereal grain(s) and/or bypass proteins may be mixed together dry and/or bypass proteins may be mixed together dry and passed through and extruded, and the extruded pelletized material is then mixed with molasses and hydrated lime in a mixer. The granules or pellets now containing the molasses are discharged from the mixer and may be allowed to cure as hereinbefore described.

B. Molasses/sorptive base material mixes
BASE MATERIAL MIXTURES

| | BMEX1 | BMEX2 | BMEX3 | BMEX4 | BMEX5 |
|---|---|---|---|---|---|
| Grain | 20 | 20 | 80 | 40 | 80 |
| Meal | 20 | 60 | 20 | 40 | — |
| Urea | 15 | — | — | 5 | 5 |
| Bentonite | 10 | 10 | — | — | 10 |
| Zeolite | 15 | — | — | 10 | 5 |
| Molasses-Dunder | 10 | 5 | — | 5 | — |
| CaO/Mgo | 10 | 5 | — | — | — |

SECONDARY DEHYDRATION

| | SDEX1 | SDEX2 | SDEX3 | SDEX4 | SDEX5 | SDEX6 |
|---|---|---|---|---|---|---|
| *Base mat | 50 | 30 | 30 | 60 | 40 | 10 |
| Diatomite | — | 5 | — | — | 10 | 10 |
| Dolomite | — | 5 | — | — | — | — |
| Gypsum | — | 5 | — | — | — | — |
| Bentonite | — | 5 | — | 10 | — | 10 |
| Zeolite | — | 5 | 5 | — | — | 5 |
| Urea | — | 10 | 5 | — | — | 5 |

B. Molasses/sorptive base material mixes -continued

| Molasses-Dunder | 50 | 30 | 50 | 30 | 50 | 60 |
|---|---|---|---|---|---|---|
| CaO/MgO | — | 5 | 10 | — | — | — |

By the addition of cereal grains or oil seeds to the mixes described above, the grain seeds may be coated to between 2–80% total mass of product by the methods described above.

The feed may be fed directly to the animals or be mixed with other feed supplements. When passed by the animals it will become mixed with the soil as a source of nutrients and fertilizer therefor.

The advantages of bentonite, zeolite and the hydrated lime in the feed are as follows:
 (a) Sodium bentonite:
  (i) Elimination of acidosis;
  (ii) Prevention of scours;
  (iii) Increased salivation;
  (iv) Improved wool growth;
  (v) Faster weight gains.
 (b) Zeolite:
  (i) Ammonia retention;
  (ii) High cationic exchange;
  (iii) Reduced odor;
  (iv) Better feed efficiency.
 (c) Lime (or magnesium) based products:
  (i) A source of calcium (or magnesium) in grain based diets;
  (ii) Moisture absorbency;
  (iii) pH control.

As stated above, the resultant product is highly palatable for animals, does not take up atmospheric moisture and is easily handled and fed.

A particular advantage of the stock feed of the present invention (in contrast with the feeds of Schroeder and Bass discussed in the prior art) is that with moderate to high pH (i.e., greater than or equal to 7.5), it can help to control ruminant animal feed intake to the desired level from a nutritional viewpoint. Also, when fed in proportion with grain, it can be used to buffer and neutralize those acid-producing feeds in the rumen of the animal, and so promote a more balanced ruman pH level for efficient digestion and for the general health and well being for the animal. By contrast, an animal fed a high grain ration together with a low pH supplement (e.g., of the type of Schroeder of Bass), would need to be treated with drugs, other (alkaline) minerals, or higher fiber intakes to offset the acid effect which otherwise can range from ill-thrift to premature mortality from, e.g., acidosis.

With regard to fertilizer in granular form, a particular advantage of the product of the present invention is the ability to include not only the beneficial minerals and nitrogen of the dunder, but also that the product will have an alkaline effect, being beneficial where many soils are excessively acidic; need not contain phosphorus as an essential component of the manufacturing process (an imperative inclusion with Bass); and can bring about the mobilization of other "fixed" soil nutrients by using zeolite's cationic exchange capabilities to make such nutrients available for plant utilization.

Additionally, as a seed coating prior to planting, dunder with zeolite can also contain a range of minerals, nitrogen sources, insecticides, bacterial cultures, etc., to facilitate the germination and early nutrient availability in an alkaline environment which would be highly beneficial to many commercial crops. These capabilities are outside the scope of the product of Bass. Similarly, a seed coating as a stock feed comprising, for example, molasses and dunder, bentonite, zeolite, lime, urea, vitamins, drugs, protein meal and concentrates can be a convenient animal feed supplement which is easily produced and cost effective and would not be suggested by reference to the prior art supplements of Schroeder and Bass.

Potential usage areas include:

(a) Magnesium supplementation of cattle for beef and dairy cattle, through free choice dry mixes, lucerne cube incorporation and lick blocks;

(b) Phosphorus supplementation of cattle in phosphorus deficient regions with alkaline supplements;

(c) Small feed mills without liquid molasses facilities;

(d) Dust suppression in opportunity cattle feed lot rations;

(e) Protein feeding to breeder cattle;

(f) One farm feed milling (pigs and poultry);

(g) Sheep feeding for fertility, lamb birth weights and myco-toxin absorption;

(h) Stock block manufacture;

(i) Angora and Mohair production;

(j) Urea fortified mix.

The embodiments described are by way of example only and various changes and modifications may be made thereto without departing from the scope of the present invention defined in the appended claims.

BEST MODE FOR CARRYING OUT INVENTION

While there is shown and described the present preferred embodiment of the invention, it is to be distinctly understood that this invention is not limited thereto but may be variously embodied to practice within the scope of the following claims.

I claim:

1. A free flowing animal feed in powder or granular form comprising:

15 to 60% of a first substance which is selected from the group consisting of dunder alone, dunder and molasses, or dunder and molasses by-products, which is included as a sugar and nutrient source;

20 to 60% of a second substance which is selected from the group consisting of bentonite, zeolite or bentonite and zeolite together; which is added as a dehydrating agent, and to cause the delayed release of nitrogen; and up to 20% of one or more phosphorus compounds providing phosphorus in an alkaline form, which is added as a source of phosphorous for nutrition purposes, and as a means of maintaining a basic pH, to aid in digestion and prevent grain acidosis; wherein the resulting mixture has a pH of 7.5 or higher; and the sugar content is 12% or less.

2. The animal feed of claim 1 in which said phosphorus compounds are selected from the group comprising dicalcium phosphate, diammonium phosphate, calcium phosphate, and phosphate rock.

3. The animal feed of claim 1 which further comprises up to 5% of magnesium oxide.

4. The animal feed of claim 1 which further comprises up to 20% of hydrated lime.

5. The animal feed of claim 1 which further comprises up to 1% trace elements.

6. The animal feed of claim 1 which further comprises up to 25% bypass proteins.

7. The animal feed of claim 1 which further comprises 20–80% of cereal grains.

8. The animal feed of claim 1 which further comprises nutritional and veterinary additives.

9. A method of making an animal feed which comprises the steps of:

blending components of a dry mixture whose components comprise;

a first substance which is selected from the group consisting of bentonite, zeolite or bentonite and zeolite together, which is added as a dehydrating agent, and to cause the delayed release of nitrogen, and which makes up 10 to 60% of a total weight of said animal feed;

one or more phosphorus compounds providing phosphorus in an alkaline form, which is added as a source of phosphorus for nutrition purposes, and as a means of maintaining a basic pH, to aid in digestion and prevent grain acidosis, which makes up 20% of said total weight of said animal feed;

blending in a mixer until evenly distributed said dry mixture with a second substance which is selected from the group consisting of dunder alone, dunder and molasses, or dunder and molasses by-products, which is included as a sugar and nutrient source, and which makes up 15–60% of said total weight of said animal feed, so that moisture from said second substance is absorbed by said dry mixture, and said dry mixture and said second substance form a moist mixture;

discharging and spreading to dry said moist mixture from said mixer in free flowing form; and curing said moist mixture for 4 to 12 hours to form a dry, free flowing granular or solid animal feed with a pH of 7.5 or greater and a sugar content of 12% of less.

10. The method of claim 9 in which said phosphorus compounds are selected from the group comprising dicalcium phosphate, diammonium phosphate, calcium phosphate, and phosphate rock.

11. The method of claim 9 in which said dry mixture further comprises magnesium oxide in a ratio which makes up to 5% of a total weight of said animal feed.

12. The method of claim 9 in which said dry mixture further comprises hydrated lime in a ratio which makes up to 20% of a total weight of said animal feed.

13. The method of claim 9 in which said dry mixture further comprises trace elements in a ratio which makes up to 1% of a total weight of said animal feed.

14. The method of claim 9 in which said dry mixture further comprises bypass proteins in a ratio which makes up to 25% of a total weight of said animal feed.

15. The method of claim 9 which further comprises the step of adding grains or bypass proteins to said dry mixture, and extruding said dry mixture before adding said second substance, discharging, and spreading, resulting in coated grain seeds which are 2 to 80% seeds, the remainder being formed of said dry mixture materials and said second substance.

16. A free flowing animal feed in powder or granular form comprising:

15 to 60% of a first substance which is selected from the group consisting of dunder alone, dunder and molasses, or dunder and molasses by-products, which is included as a sugar and nutrient source;

20 to 60% of a second substance which is selected from the group consisting of bentonite, zeolite or bentonite and zeolite together, which is added as a dehydrating agent, and to cause the delayed release of nitrogen;

up to 20% of one or more phosphorus compounds providing phosphorus in an alkaline form, selected from the group comprising dicalcium phosphate, diammonium phosphate, calcium phosphate, and phosphate rock, which is added as a source of phosphorus for nutrition purposes, as a means of maintaining a basic pH, and to aid in digestion and prevent grain acidosis;

up to 25% of magnesium oxide;

up to 1% trace elements;

up to 15% of hydrated lime;

up to 25% bypass proteins;

20–80% of cereal, oil, or grain seeds;

and which further comprises nutritional and veterinary additives; and wherein the resulting mixture has a pH of 7.5 or higher, and the sugar content is 12% or less.

17. The animal feed of claim 2 wherein the composition additionally incorporates up to 25% of substances selected from the group consisting of drugs, vitamins, urea, protein meal, bypass proteins, and trace elements.

* * * * *